(12) United States Patent
Friedrich

(10) Patent No.: US 7,359,472 B2
(45) Date of Patent: Apr. 15, 2008

(54) METHOD AND APPARATUS FOR WIRELESS DATA TRANSMISSION

(75) Inventor: Ulrich Friedrich, Ellhofen (DE)

(73) Assignee: Atmel Germany GmbH, Heilbronn (DE)

( * ) Notice: Subject to any disclaimer, the term of this patent is extended or adjusted under 35 U.S.C. 154(b) by 612 days.

(21) Appl. No.: 11/104,418

(22) Filed: Apr. 13, 2005

(65) Prior Publication Data

US 2005/0232369 A1 Oct. 20, 2005

(30) Foreign Application Priority Data

Apr. 14, 2004 (DE) ............... 10 2004 019 311

(51) Int. Cl.
*H04L 7/02* (2006.01)

(52) U.S. Cl. .............. 375/361; 375/133; 375/268; 375/300; 332/158; 332/167

(58) Field of Classification Search ......... 375/133, 375/135, 268, 269, 300, 307, 354, 361; 455/108, 455/113; 332/158, 161, 167
See application file for complete search history.

(56) References Cited

U.S. PATENT DOCUMENTS

| | | | |
|---|---|---|---|
| 5,278,514 A | * | 1/1994 | Chihara et al. ............ 329/302 |
| 5,295,180 A | * | 3/1994 | Vendetti et al. .......... 455/456.2 |
| 5,905,769 A | | 5/1999 | Lee et al. |
| 6,134,275 A | | 10/2000 | Reiner |
| 2004/0246102 A1 | | 12/2004 | Jaakkola et al. |

FOREIGN PATENT DOCUMENTS

| | | |
|---|---|---|
| DE | 196 34 134 C1 | 10/2000 |
| DE | 102 13 873 A1 | 10/2003 |
| EP | 0 592 781 B1 | 11/1998 |
| FI | 20011943 A | 4/2003 |
| JP | 55-147061 | 11/1980 |
| WO | WO 97/07413 A1 | 2/1997 |

* cited by examiner

*Primary Examiner*—Dac V. Ha
(74) *Attorney, Agent, or Firm*—Muncy, Geissler, Olds & Lowe PLLC

(57) ABSTRACT

A method and apparatus for wireless data transmission between a base station and one or more, in particular, passive and/or backscatter-based transponders, in which the base station modulates a carrier signal with a modulation signal, to generate synchronization markers, and transmits the modulated carrier signal. Whereby, a frequency of the modulated carrier signal can be switched between different frequency values.

16 Claims, 1 Drawing Sheet

METHOD AND APPARATUS FOR WIRELESS DATA TRANSMISSION

This nonprovisional application claims priority under 35 U.S.C. § 119(a) on German Patent Application No. DE 102004019311.8-31, which was filed in Germany on Apr. 14, 2004, and which is herein incorporated by reference.

BACKGROUND OF THE INVENTION

1. Field of the Invention

The present invention relates to a method and apparatus for wireless data transmission between a base station and one or more transponders.

2. Description of the Background Art

Transmission methods between one or more base stations or readers and one or more transponders are used, for example, in contactless identification systems or so-called radio frequency identification (RFID) systems. Sensors, for example, for temperature measurement, can also be integrated into the transponder. Such transponders can also be called remote sensors.

Transponders or their transmitting and receiving devices typically do not have an active transmitter for data transmission to the base station. Such inactive systems are called passive systems when they do not have their own power supply, and semipassive systems when they have their own power supply. Passive transponders derive the energy necessary for their supply from the electromagnetic field emitted by the base station.

Backscatter coupling is typically employed for data transmission from a transponder to a base station with UHF or microwaves in the far field of the base station. For this purpose, the base station emits electromagnetic carrier waves, which are modulated and reflected by the transmitting and receiving device of the transponder corresponding to the data to be transmitted to the base. Typical modulation methods include amplitude modulation, phase modulation, and amplitude shift keying (ASK) subcarrier modulation, in which the frequency or the phase position of the subcarrier is modified.

When data transmission between the base station and a transponder occurs synchronously, the base station generates synchronization markers or symbol delimiting markers, which are also called "notches." In this case, the transponder changes the backscattered signal synchronously to the synchronization markers generated and transmitted by the base station. Furthermore, the synchronization markers can be used for data transmission from the base station to the transponder. The significant value of a symbol transmitted by the base station is hereby, for example, determined by the time interval or a duration between two successive synchronization markers. If the duration is above, for example, a settable threshold, the value of the symbol is "1" or otherwise "0."

Various methods are known for generating synchronization markers. In general, hereby, the electromagnetic carrier waves or the carrier signal are amplitude- and/or phase-modulated by the base station with a modulation signal. Typically, a delimiting marker is detected in a transponder with use of a so-called RSSI (radio signal strength indicator) circuit.

A method based on amplitude modulation, in which the modulation signal suppresses or hides the carrier signal during a certain modulation time, is the on-off-keying (OOK). The modulated signal, however, has a relatively broadband spectrum. In passive systems, which derive the energy for their supply from the carrier signal, the energy input is also suppressed during the modulation time, as a result of which the achievable range is reduced accordingly. A reduction in the modulation time, during which the carrier signal is hidden, is, however, not arbitrarily possible because the bandwidth required thereby increases.

To increase the transmission range, methods are known, which do not completely hide the carrier signal during the modulation time, i.e., have a modulation index that is less than one. This, however, leads to a decline in transmission security because the delimiting markers can no longer be recognized as certainly as in complete masking.

To reduce the required bandwidth, the modulation signal during the modulation time can have a sinusoidal shape. In other words, the carrier signal is not hidden with a so-called rectangular function, but turned off and again on in a sinusoidal manner.

A form of amplitude modulation is double sideband modulation (DSBM) with a suppressed carrier. The frequency of the carrier signal is suppressed in the resulting spectrum of the modulated signal.

A method is described in FI 20011943, which corresponds to U.S. Publication No. 20040246102, and in which synchronization markers are generated with use of a cosinusoidal modulation signal. The modulation of the carrier signal occurs with use of an IQ modulator, where the modulation signal is applied to the I-input of the IQ modulator and its Q input is kept constant.

Devices in the vicinity of an RFID system, which can also communicate wirelessly, can interfere with data transmission between the base station and the transponders. To reduce the effects of such interference, the frequency of the carrier signal or the modulated carrier signal can be switched or changed between different frequency values. This, for example, reduces the effect of a specific interfering frequency. In some cases, a frequency hopping is also specified by applicable standards.

Because transmission may be made at a specific time only at one frequency, with frequency hopping, the carrier signal must be briefly suppressed before the switching. This suppression causes the RSSI circuit of the transponder to detect a synchronization marker, which can be interpreted as a component of a frame or protocol.

Various scenarios are possible here. If the frequency hopping occurs outside a frame, the synchronization marker evoked by the frequency hopping is interpreted as the beginning of a frame. Due to the absence of a frame no further synchronization markers are received, a receiving unit of the transponder is reset to the initial state after the elapse of a maximum time, because otherwise a communication block would occur. This, however, reduces the possible data throughput.

Another possibility is for frequency hopping to occur within a frame or protocol. If hereby a carrier signal of a first frequency is hidden and a carrier signal of a second frequency is shown, due to the different phase positions of the carrier signals in a transition phase, destructive interference can occur, which is wrongly recognized as a synchronization marker in a transponder. This produces a faulty frame, which can be detected from the presence of a data link layer. If a faulty frame is detected, error processing occurs according to a protocol agreement. As a rule, resynchronization occurs; i.e., the frame is repeated.

In ISO WD 18000-6 model of January 2002, a method is described in which frequency hopping can also occur within a frame, but within a specified, reserved field. Frequency hopping, however, requires resynchronization here as well.

A frequency hopping method is described in WO 97/07413, which corresponds to U.S. Pat. No. 5,905,769, and which uses a switchable synthesizer to switch the carrier frequency. In this case, however, switching times in the millisecond range arise, where no carrier signal is transmitted during the switching times. Because passive transponders are not supplied with power from the electromagnetic field, suitable energy buffers must be present in the transponder and the transmission range is reduced.

SUMMARY OF THE INVENTION

It is therefore an object of the present invention to provide a method and a circuit configuration for wireless data transmission, which make possible a time-saving switching of the frequency of the carrier signal without resynchronization or repetition of a frame being compellingly necessary.

In an example embodiment of the invention, a frequency of the modulated carrier signal can be switched in a range of the synchronization markers. This meets the condition that only one frequency may be used for transmission at a time, because the carrier signal is at least approximately suppressed in the range of the synchronization markers, i.e., at the time of switching. Furthermore, no additional synchronization marker arises due to the frequency hopping. In other words, the frame during which frequency hopping occurs is not disturbed by the frequency hopping. Thus, the possible data throughput increases.

The frequency of the modulated carrier signal can be switched in the range of a zero throughput of the modulation signal.

The modulation can be an amplitude modulation. The amplitude modulation provides for robust data transmission with high noise immunity, where the demodulation in a transponder can be realized simply in terms of circuitry engineering.

The modulation signal can be a cosinusoidal signal. The resulting modulated signal hereby has a favorable, relatively narrowband spectrum.

The modulation signal can be used for double sideband modulation with a suppressed carrier. In this type of modulation, the frequency of the carrier signal in the spectrum of the modulated signal is suppressed, enabling improved utilization of the available spectrum.

The time between successive frequency switching processes can be determined with use of a random generator. This reduces, for example, the probability of disruption or interference within different RFID systems.

A first carrier signal with a first frequency can be generated, and substantially simultaneously a second carrier signal with a second frequency can be generated. Either the carrier signal of the first frequency or the carrier signal of the second frequency can be modulated with the modulation signal and the carrier signal modulated in this manner is then transmitted. The substantially simultaneous generation of carrier signals of a different frequency makes it possible to rapidly switch between different frequency values, because transient periods of oscillators do not affect the switching speed.

In an alternative example embodiment, a first carrier signal with a first frequency is generated and modulated with the modulation signal, wherein a first modulated carrier signal arises, and substantially simultaneously a second carrier signal with a second frequency is generated and modulated with the modulation signal, wherein a second modulated carrier signal arises, and either the first modulated carrier signal or the second modulated carrier signal is transmitted. This also makes it possible to rapidly switch between different frequency values.

The apparatus, according to an example embodiment, can include a control unit, which generates a control signal so that switching of a multiplexer unit occurs in the range of synchronization markers, particularly in the range of a zero throughput of the modulation signal.

A first and/or a second oscillator circuit can be a voltage controlled oscillator (VCO). Components of this type provide reliable generation of an adjustable carrier frequency.

Also, the control unit can be a microcontroller or a random generator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
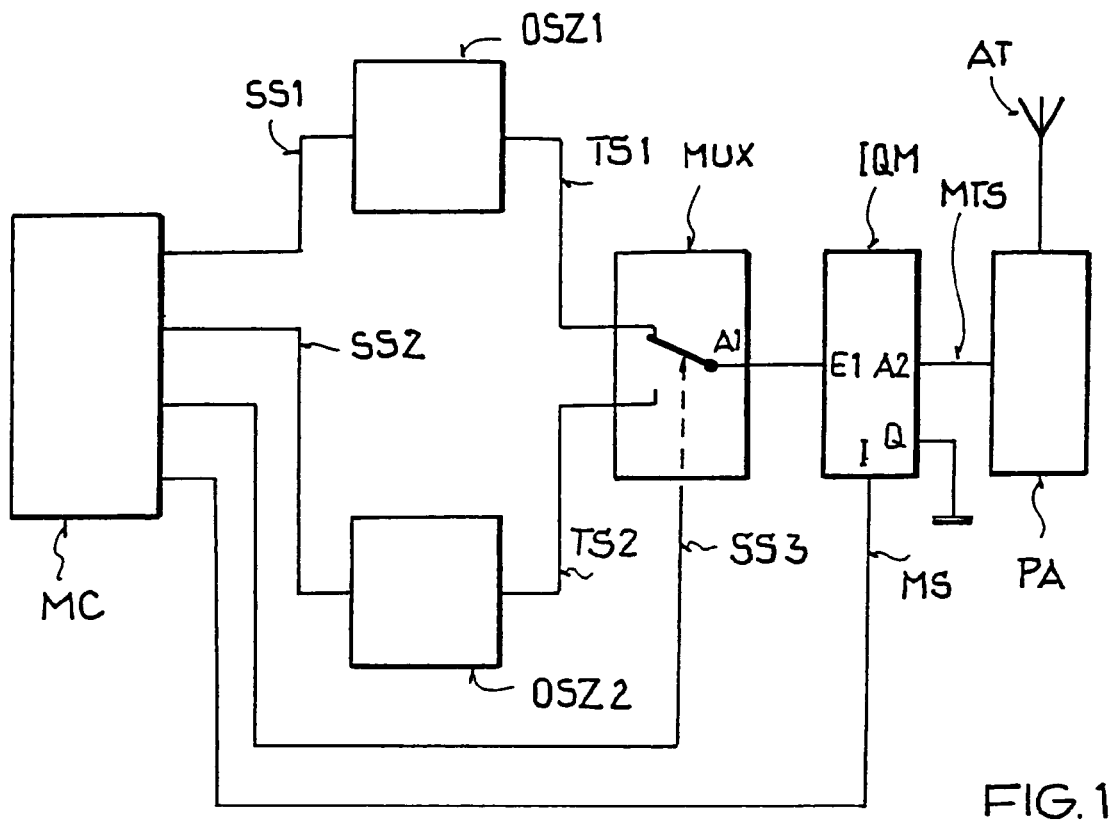
FIG. 1 is a block diagram of an apparatus integrated into a base station for wireless data transmission, according to an example embodiment of the present invention.

FIG. 1 shows a block diagram of an apparatus integrated into a base station for wireless data transmission having a control unit, for example, a microcontroller MC, a first oscillator circuit OSZ1, which can be designed as a VCO, to generate a first carrier signal TS1 having a first frequency, a second oscillator circuit OSZ2, which can be a VCO, to generate a second carrier signal TS2 having a second frequency, a multiplexer unit MUX, a modulator unit, for example, an IQ mixer or an IQ modulator IQM, a power amplifier PA, and an antenna AT.

Figure 2:
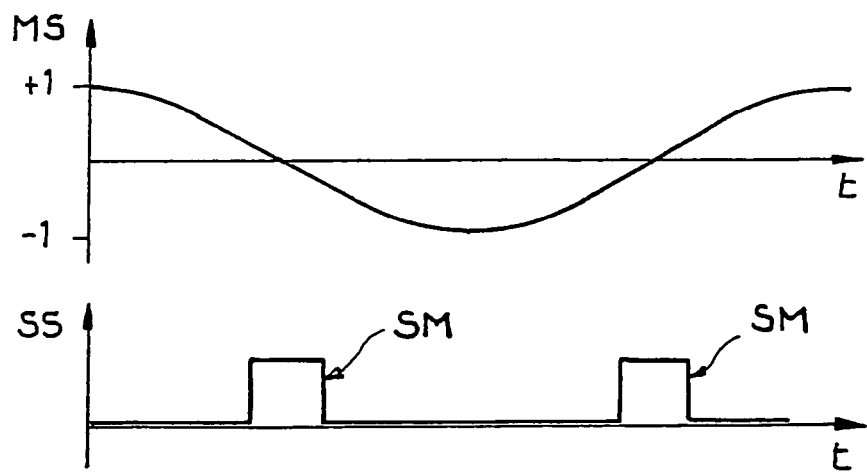
FIG. 2 is a diagram of a modulation signal of a base station for double sideband modulation with a suppressed carrier and a resulting synchronization marker signal generated in an RSSI circuit of a transponder, according to an example embodiment of the present invention.

The microcontroller MC during a data transmission or during a frame generates a cosinusoidal modulation signal MS, as shown in FIG. 2, which is used to generate synchronization markers based on, for example, a double sideband modulation having a suppressed carrier. Alternatively, the modulation signal can also be generated by a separate unit, specifically provided for this, for example, by a function generator. Furthermore, the microcontroller MC generates control signals SS1 and SS2 to control the oscillator circuits OSZ1 and OSZ2, respectively, which set their initial frequency as a function thereof. The microcontroller MC also generates a control signal SS3 to control the multiplexer unit MUX.

The multiplexer unit MUX receives the first carrier signal TS1, the second carrier signal TS2, and the control signal SS3. The control signal SS3 specifies which of the carrier signals TS1 or TS2 is applied to an output A1 of the multiplexer unit MUX.

The carrier signal TS1 or TS2 applied to the output A1 is applied to a carrier signal input E1 of the IQ mixer IQM. The modulation signal MS is applied to an input I of the IQ mixer IQM. An input Q of the IQ mixer IQM is connected to a reference potential. This wiring of the IQ mixer IQM has the effect that only the I component of the modulated signal is changed in the phase diagram during a change in the modulation signal. The modulated signal MTS, which is applied at the output A2 of the IQ mixer IQM, is supplied to the power amplifier PA, and/or optionally to a filter that is not shown, and is emitted via the antenna AT, i.e., transmitted.

FIG. 2 shows a timing diagram of the modulation signal MS of FIG. 1 for double sideband modulation having a suppressed carrier and resulting synchronization markers signal SS being generated in an RSSI circuit of a passive transponder (not shown). The cosinusoidal modulation signal MS, shown in the top part of FIG. 2, changes the phase position of the modulated carrier signal MTS during a transition from +1 to −1 or from −1 to +1 by 180°.

In a bottom part of FIG. 2, there is shown the resulting synchronization marker signal SS in the transponder during the receiving of the modulated carrier signal MTS, which is modulated with the modulation signal MS shown above. In the range of the phase transition, the power of the modulated carrier signal MTS declines or becomes zero for a brief period, which is detected by the RSSI circuit of the transponder. A rectangular shape of the synchronization marker signal SS with synchronization markers SM occurs in the range of the phase transitions of the modulated carrier signal MTS.

The frequency of the modulated carrier signal MTS transmitted by the base station is switched between different frequency values at certain time intervals. The time between successive frequency switching processes is determined with use of a random generator, which is realized as a software process in the microcontroller MC. Here, a switching between two or more than two different frequency values can occur. To generate more than two different frequency values, the control signal SS1 or SS2 adjusts the carrier signal, momentarily not transmitted from the microcontroller MC, so that the desired frequency results.

Frequency hopping or a switching of the frequency occurs through the suitable selection of the level of the control signal SS3. Depending on the level of the control signal SS3, either the first carrier signal TS1 or the second carrier signal TS2 is applied to the output A1 of the multiplexer unit MUX and consequently also to the carrier signal input E1 of the IQ modulator IQM.

The frequency of the modulated carrier signal MTS is switched in the range of the synchronization markers SM, shown in FIG. 2, by the microcontroller MC. For this purpose, the control signal SS3 is adjusted so that a switching between the carrier signals TS1 and TS2 occurs at the carrier signal input E1 of the IQ modulator IQM at the desired time. Because the synchronization markers SM arise in the range of a zero throughput of the modulation signal MS, because the transmitting performance of the base station declines or goes back to zero there, the switching can occur, for example, within a range, symmetrical to the zero throughput, from 1 μs to 10 ms in duration. The duration of the range depends hereby, inter alia, on the selected transmission rate.

Transmission is made at one time only with one frequency because of the frequency switching in the range of the synchronization markers SM or in the range of the zero throughput of the modulation signal MS. Furthermore, because of the frequency hopping, no additional synchronization marker SM arises, because a synchronization marker SM has already been generated at this time. The frame during which frequency hopping occurs is therefore not disturbed by the frequency hopping. Thus, the possible data throughput increases.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for wireless data transmission between a base station and one or more transponders, the method comprising the steps of:

modulating, by the base station, a carrier signal with a modulation signal to generate synchronization markers; and transmitting the modulated carrier signal, wherein a frequency of the modulated carrier signal can be switched between different frequency values, and wherein the frequency of the modulated carrier signal is switched in a range of the synchronization markers.

2. The method according to claim 1, wherein the frequency of the modulated carrier signal is switched in the range of a zero throughput of the modulation signal.

3. The method according to claim 1, wherein the modulation of the carrier signal with the modulation signal is an amplitude modulation.

4. The method according to claim 1, wherein the modulation signal is a cosinusoidal signal.

5. The method according to claim 1, wherein the modulation signal is for double sideband modulation having a suppressed carrier.

6. The method according to claim 1, wherein a time between successive frequency switching processes is determined with the use of a random generator.

7. The method according to claim 1, wherein a first carrier signal having a first frequency is generated, wherein substantially simultaneously a second carrier signal having a second frequency is generated, and wherein the carrier signal is selected from either the first carrier signal having the first frequency or the second carrier signal having the second frequency and is then modulated with the modulation signal and is transmitted.

8. The method according to claim 1, wherein:

a first carrier signal having a first frequency is generated and modulated with the modulation signal, thereby forming a first modulated carrier signal, a second carrier signal having a second frequency is generated and modulated with the modulation signal, thereby forming a second modulated carrier signal, and either the first modulated carrier signal or the second modulated carrier signal is transmitted as the modulated carrier signal.

9. The method according to claim 1, wherein the transponder is a passive and/or backscatter-based transponder.

10. An apparatus for wireless data transmission between a base station and one or more transponders, the apparatus comprising:

a first oscillator circuit for generating a first carrier signal having a first frequency;

a second oscillator circuit for generating a carrier signal having a second frequency;

a multiplexer unit, which receives the first carrier signal and the second carrier signal, and which, depending on a control signal, applies either the first carrier signal or the second carrier signal to an output thereof;

a modulation signal generating unit for generating a modulation signal, which is used to generate synchronization markers;

a modulator unit, for modulating either the first carrier signal or the second carrier signal, which is applied at the output of the multiplexer unit, with the modulation signal; and a control unit for generating a control signal to switch the multiplexer unit in a range of the synchronization markers.

11. Apparatus according to claim 10, characterized in that the first (OSZ1) and/or the second oscillator circuit (OSZ2) is a voltage controlled oscillator (VCO).

12. Apparatus according to claim 10 or 11, characterized in that the control unit is a microcontroller (MC) or a random generator.

13. The apparatus according to claim 10, wherein the transponder is a passive and/or backscatter-based transponder.

14. The apparatus according to claim 10, wherein the first frequency and the second frequency have different frequencies.

15. The apparatus according to claim 10, wherein the modulator unit is an IQ mixer.

16. The apparatus according to claim 10, wherein the multiplexer unit is switched in a range of a zero throughput of the modulation signal.

* * * * *